United States Patent
Sumida et al.

(10) Patent No.: US 8,048,177 B2
(45) Date of Patent: Nov. 1, 2011

(54) METHOD FOR TREATMENT OF DRAIN IN HYDROGEN PRODUCTION AND HYDROGEN PRODUCTION SYSTEM

(75) Inventors: Toshihiko Sumida, Hyogo (JP); Yoshinori Takata, Hyogo (JP); Masanori Miyake, Hyogo (JP); Yoshiaki Imoto, Hyogo (JP)

(73) Assignee: Sumitomo Seiko Chemicals Co., Ltd., Hyogo (JP)

( * ) Notice: Subject to any disclaimer, the term of this patent is extended or adjusted under 35 U.S.C. 154(b) by 260 days.

(21) Appl. No.: 12/300,366

(22) PCT Filed: May 7, 2007

(86) PCT No.: PCT/JP2007/059465
§ 371 (c)(1),
(2), (4) Date: Nov. 11, 2008

(87) PCT Pub. No.: WO2007/132693
PCT Pub. Date: Nov. 22, 2007

(65) Prior Publication Data
US 2009/0148381 A1    Jun. 11, 2009

(30) Foreign Application Priority Data

May 11, 2006    (JP) .................................. 2006-132719

(51) Int. Cl.
*B01J 7/00*    (2006.01)
*C01B 3/36*    (2006.01)
*C01B 6/24*    (2006.01)
*C01B 3/02*    (2006.01)
*C10J 3/46*    (2006.01)
*C02F 1/72*    (2006.01)
*C02F 1/68*    (2006.01)

(52) U.S. Cl. ........... 48/61; 48/197 R; 210/758; 210/762; 423/644; 423/648.1

(58) Field of Classification Search .......... 48/61, 197 R; 210/758, 762; 423/644, 648.1
See application file for complete search history.

(56) References Cited

U.S. PATENT DOCUMENTS

| 4,206,875 | A | * | 6/1980 | Grasso ............................ 237/55 |
| 5,205,906 | A | * | 4/1993 | Grutsch et al. ............... 159/47.3 |
| 2002/0081469 | A1 | | 6/2002 | Nomura et al. |
| 2002/0081470 | A1 | | 6/2002 | Hanai et al. |
| 2007/0237691 | A1 | | 10/2007 | Takata et al. |

FOREIGN PATENT DOCUMENTS

EP    1 787 951    5/2007

(Continued)

*Primary Examiner* — Matthew Merkling
(74) *Attorney, Agent, or Firm* — Hamre, Schumann, Mueller & Larson, P.C.

(57) ABSTRACT

A method for treating drain in hydrogen production includes steps of gasifying in a gasifier (1), reforming in a reformer (2), gas-liquid separation in a gas-liquid separator (4), PSA gas separation in a PSA separator (5) and evaporation in a drain treatment unit (6). In the gasifying, a mixed material containing methanol is heated and gasified. In the reforming, reformed gas containing hydrogen is produced from the mixed material by reforming reaction of methanol. In the gas-liquid separation, a liquid component is separated from the reformed gas and discharged as drain. In the PSA gas separation, hydrogen-rich gas and offgas are extracted from the reformed gas by PSA separation using an adsorption tower. In the gasifying, the offgas is burned, and the mixed material is heated by using the combustion gas as heat source. In the evaporation, drain is evaporated using the combustion gas after heating the mixed material as heat source.

7 Claims, 1 Drawing Sheet

FOREIGN PATENT DOCUMENTS

| | | |
|---|---|---|
| JP | 5-347159 | 12/1993 |
| JP | 2000-223144 | 8/2000 |
| JP | 2002-198073 | 7/2002 |
| JP | 2002-246050 | 8/2002 |
| JP | 2006-100101 | 4/2006 |
| WO | WO 2006/006479 | 1/2006 |

* cited by examiner

METHOD FOR TREATMENT OF DRAIN IN HYDROGEN PRODUCTION AND HYDROGEN PRODUCTION SYSTEM

TECHNICAL FIELD

The present invention relates to a method for treating drain generated in industrially producing hydrogen from a hydrocarbon-based material. The invention also relates to a hydrogen production system for properly performing the drain treatment method.

BACKGROUND ART

Hydrogen (high-purity hydrogen) is utilized in various industrial fields such as metal heat treatment, glass melting, semiconductor -manufacturing or optical fiber manufacturing. Hydrogen is also used as the fuel of a fuel cell.

An example of hydrogen production system for industrially producing hydrogen is disclosed in Patent Document 1 given below. The hydrogen production system disclosed in Patent Document 1 includes a gasifier, a reformer, a gas-liquid separator and a pressure swing adsorption gas separation apparatus and is designed to produce hydrogen using a hydrocarbon-based material as the main material. The gasifier serves to heat and gasify a mixed material containing a hydrocarbon-based material such as methanol or natural gas, water and oxygen before it is supplied to the reformer. In the gasifier, the mixed material flowing in the gasifier is heated to an appropriate temperature by utilizing high-temperature combustion gas produced by burning fuel as the heat source. In the reformer, the gasified mixed material is subjected to reforming reaction to obtain reformed gas (containing hydrogen). Specifically, in the reformer, both of steam reforming reaction which is endothermic reaction and partial oxidation reforming reaction which is exothermic reaction occur. For instance, in the steam reforming reaction, hydrogen as the main product and carbon dioxide as the sub product are produced from methanol and water. For instance, in the partial oxidation reforming reaction, hydrogen as the main product and carbon dioxide as the sub product are obtained from methanol and oxygen. In the gas-liquid separator, before the reformed gas produced by the reformer is supplied to the pressure swing adsorption gas separation apparatus which will be described later, the liquid component contained in the reformed gas is separated and removed from the gas and discharged as drain. In this hydrogen production system, the composition of the mixed material is so adjusted that the amount of heat absorbed by the steam reforming reaction and the amount of heat generated by the partial oxidation reforming reaction balance each other, whereby autothermal reforming reaction proceeds in which the reaction temperature in the reformer is maintained substantially constant.

Patent Document 1: WO2006/006479

The pressure swing adsorption gas separation apparatus serves to adsorb and remove unnecessary components, i.e., components other than hydrogen from the reformed gas to produce hydrogen-rich gas as product gas. The apparatus includes at least one adsorption tower loaded with an adsorbent for adsorbing preferentially the unnecessary components contained in the reformed gas. In the pressure swing adsorption gas separation apparatus, gas separation by the pressure swing adsorption gas separation method (PSA separation method) is performed. For instance, in the gas separation by the PSA separation method, a cycle including an adsorption step, a desorption step and a regeneration step is repetitively performed in an adsorption tower. In the adsorption step, reformed gas after passing through the gas-liquid separator is supplied into the adsorption tower where the unnecessary component contained in the reformed gas is adsorbed under high pressure, whereby hydrogen-rich gas is discharged from the adsorption tower. In the desorption step, the pressure in the adsorption tower is reduced for desorbing the unnecessary component from the adsorbent, and the gas (offgas) containing hydrogen remaining in the tower and the unnecessary component is discharged from the adsorption tower. In the regeneration step, the adsorption ability of the adsorbent for the unnecessary component is recovered by e.g. supplying cleaning gas into the adsorption tower.

In the adsorption step described above, the reformed gas from which the liquid components have been removed by passing through the gas-liquid separator is introduced Into the adsorption tower. Thus, the liquid components in the reformed gas are prevented from entering the adsorption tower. As a result, the deterioration of the adsorbent in the adsorption tower due to the contact with liquid components is prevented.

The offgas discharged from the adsorption tower is supplied to the gasifier as the fuel for combustion (fuel for gasifying the mixed material). In the gasifier, hydrogen gas contained in the offgas is burned to produce high-temperature combustion gas. The mixed material flowing within the gasifier is heated by the combustion gas utilized as a heat source to be gasified. The combustion gas after used for heating the mixed material in this way is discharged into the atmosphere.

In the hydrogen production system disclosed in Patent Document 1, the amount of offgas to be discharged from the PSA separation apparatus and supplied to the gasifier (supply per unit time) in the operation can be adjusted. This adjustment ensures that, during the normal operation after the lapse of a predetermined time from the start of the operation, the fuel required for heating and gasifying the mixed material at a desired temperature in the gasifier is provided only by the offgas supplied from the PSA separation apparatus. Moreover, in the hydrogen production system disclosed in Patent Document 1, the interior of the reformer is maintained at a desired reaction temperature by adjusting the ratio between the steam reforming reaction and the partial oxidation reforming reaction of the hydrocarbon-based material proceeding in the reformer. In this way, in the normal operation of the hydrogen production system disclosed in Patent Document 1, the heating and gasifying of the mixed material is performed only by the self-generating heat obtained in operating the system, and the interior of the reformer is maintained at a desired temperature. With such a thermally-independent hydrogen production system, hydrogen is produced efficiently by avoiding the inefficient technique of continuously heating the mixed material and the interior of the reformer by burning external fuel.

In recent years, restrictions on environmental pollutant and hazardous substances are strict, and further, restrictions on a method for treating industrial waste also tend to become strict. In the hydrogen production system disclosed in Patent Document 1, the drain removed by the gas-liquid separator is mainly composed of water contained in the mixed material. When the hydrocarbon-based material constituting the mixed material is methanol, the drain may contain unreacted methanol. In this case, to comply with the recent restrictions on hazardous substances, it is necessary to additionally provide a facility exclusively used for drain treatment or provide a facility for storing the drain and transfer the stored drain to a dealer as industrial waste.

However, to additionally provide a facility for drain treatment is not desirable, because the installation of the facility requires high cost. On the other hand, when the drain is to be disposed of by utilizing a drain storage facility, the cost for the maintenance and disposal of the drain is necessary in addition to the cost for installing the storage facility. Such cost for maintenance and disposal increases in accordance with an increase in the amount of drain, which increases in direct proportion to an increase in the amount of product gas (hydrogen-rich gas). These problems about the drain treatment are not peculiar to this hydrogen production system. For instance, other equipment or apparatuses for producing gas may involve the same problems.

DISCLOSURE OF THE INVENTION

The present invention has been proposed under the circumstances described above. Thus, in a thermally-independent hydrogen production system in which mixed material is continuously heated and gasified by the self-generating heat obtained by the system operation and the interior of the reactor is maintained at a desired temperature during the normal operation, the present invention aims to provide a method for efficiently treating drain generated in the operation of the system while suppressing the cost for the treatment.

Another object of the present invention is to provide a system for properly performing such a treatment method.

According to a first aspect of the present invention, there is provided a method for treating drain in hydrogen production comprising a gasifying step for gasifying a mixed material containing a hydrocarbon-based material by heating, a reforming step for producing reformed gas containing hydrogen from the gasified mixed material by reforming reaction of the hydrocarbon-based material, a gas-liquid separation step for separating and removing a liquid component contained in the reformed gas from the reformed gas for discharge as drain, and a pressure swing adsorption gas separation step using an adsorption tower loaded with an adsorbent, in which the reformed gas after the gas-liquid separation step is supplied into the adsorption tower for adsorbing an unnecessary component contained in the reformed gas by the adsorbent, hydrogen-rich gas is discharged from the adsorption tower, the unnecessary component is desorbed from the adsorbent, and offgas containing hydrogen remaining in the adsorption tower and the unnecessary component is discharged. The gasifying step comprises burning the offgas discharged from the adsorption tower to produce combustion gas and heating the mixed material by using the combustion gas as heat source. The method further comprises an evaporating step for evaporating the drain discharged by the gas-liquid separation step by using the combustion gas after heating the mixed material as heat source.

In this method for treating drain in hydrogen production, the drain discharged by the gas-liquid separation step is subjected to the evaporation step to be gasified and discharged into the atmosphere. In the evaporation step, the combustion gas after heating the mixed material in the gasifying step is used as the heat source for evaporating the drain. In this way, in this treatment method, the drain is treated using only the self-generating heat produced by the hydrogen production. Thus, the drain treatment can be performed efficiently while suppressing the cost.

Preferably, the treatment method further comprises a decomposing step for decomposing a hazardous component contained in the gas produced by the evaporation step by catalysis. In this case, even when a hazardous component is contained in the drain, the hazardous component is decomposed in the decomposition step to become harmless after gasified in the evaporation step. With this method, therefore, the drain treatment is performed efficiently and properly even when the drain contains a hazardous component.

Preferably, the treatment method further comprises a heat exchange step for preheating the mixed material before the gasifying step by heat exchange with the reformed gas in a state before the gas-liquid separation step. By this heat exchange step, the thermal energy of the high-temperature reformed gas is transferred to the mixed material in the state before undergoing the gasifying step, so that the heat required for gasifying the mixed material is reduced.

According to a second aspect of the present invention, there is provided a hydrogen production system comprising a gasifier for gasifying a mixed material containing a hydrocarbon-based material by heating, a reformer for producing reformed gas containing hydrogen from the gasified mixed material by reforming reaction of the hydrocarbon-based material, a gas-liquid separator for separating and removing a liquid component contained in the reformed gas from the reformed gas for discharge as drain, and a pressure swing adsorption gas separation apparatus for performing pressure sing adsorption gas separation using an adsorption tower loaded with an adsorbent, in which the reformed gas after passing through the gas-liquid separator is supplied into the adsorption tower for adsorbing an unnecessary component contained in the reformed gas by the adsorbent, hydrogen-rich gas is discharged from the adsorption tower, the unnecessary component is desorbed from the adsorbent, and offgas containing hydrogen remaining in the adsorption tower and the unnecessary component is discharged. The gasifier is designed to burn the offgas discharged from the adsorption tower to produce combustion gas and heat the mixed material by using the combustion gas as heat source. The system further comprises an evaporator for evaporating the drain discharged from the gas-liquid separator by using the combustion gas after heating the mixed material as heat source.

With the hydrogen production system having the above-described structure, the method according to the first aspect of the present invention can be performed properly. Thus, in the drain treatment process in hydrogen production, this hydrogen production system can enjoy the same advantages as those described above as to the first aspect of the present invention.

Preferably, the hydrogen production system further comprises a decomposer for decomposing a hazardous component contained in the gas produced by the evaporator by catalysis.

Preferably, the evaporator and the decomposer are provided in a common container, and the decomposer is arranged downstream from the evaporator.

Preferably, the container is provided with a jacket at a periphery thereof into which drain is supplied from the gas-liquid separator, and the jacket communicates with the evaporator in the container.

Preferably, the evaporator comprises an evaporation tower in a form of a bottomed pipe.

Preferably, the decomposer includes an oxidation catalyst.

Preferably, the hydrogen production system further comprises a heat exchanger for preheating the mixed material in a state before being supplied to the gasifier by heat exchange with reformed gas in a state before being supplied to the gas-liquid separator.

Other features and advantages of the present invention will become more apparent from the detailed description given below with reference to the accompanying drawings.

BEST MODE FOR CARRYING OUT THE INVENTION

Figure 1:
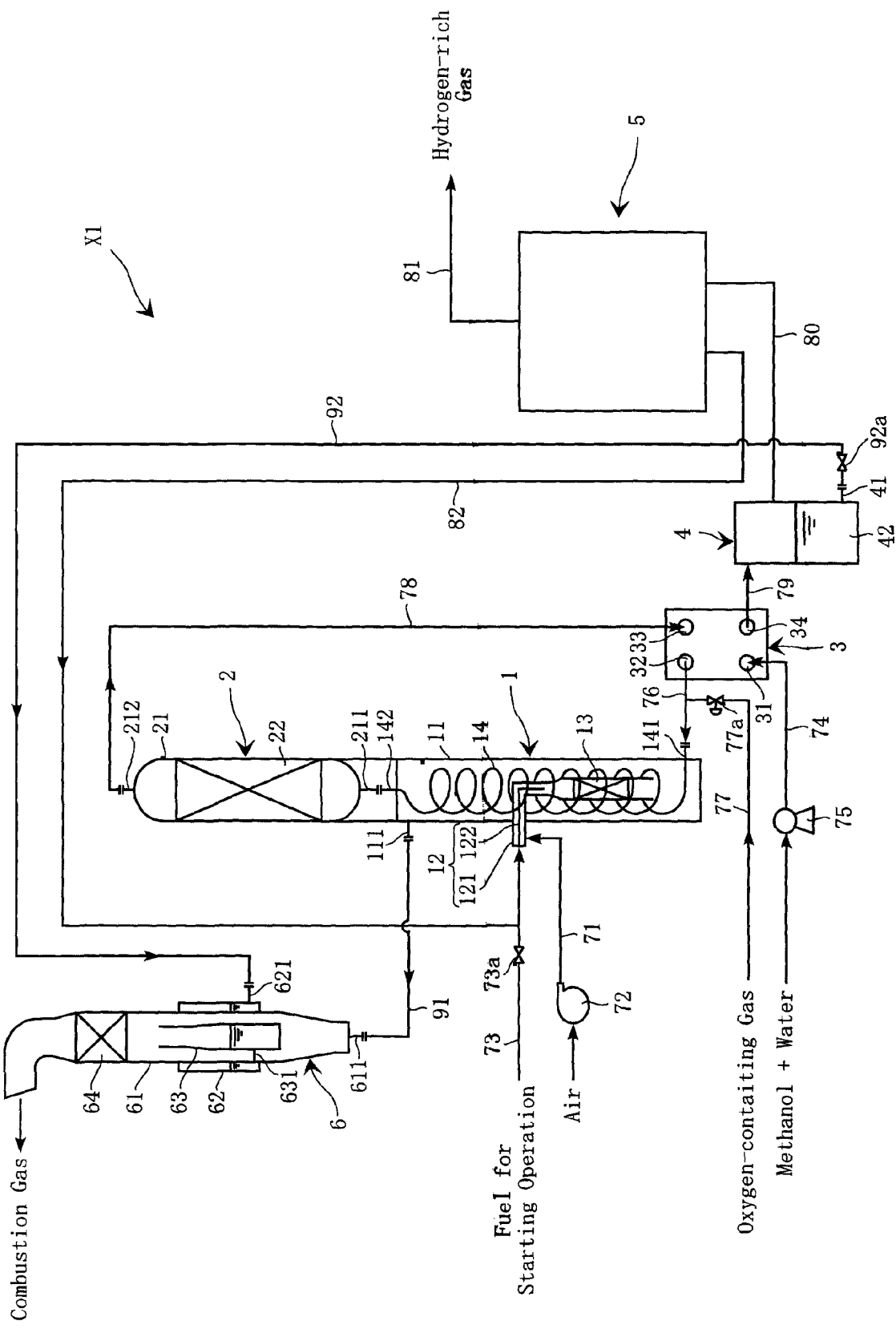
FIG. 1 is a schematic structural view of a hydrogen production system according to the present invention.

FIG. 1 shows a hydrogen production system X1 according to an embodiment of the present invention. The hydrogen production system X1 includes a gasifier 1, a reformer 2, a heat exchanger 3, a gas-liquid separator 4, a pressure swing adsorption gas separation apparatus (PSA separation apparatus) 5 and a drain treatment unit 6, and is designed to produce hydrogen using methanol, which is a hydrocarbon-based material, as the main material.

The gasifier 1 includes a main container 11, a supply pipe 12, a catalytic combustion portion 13 and a distribution pipe 14. In the gasifier 1, a mixed material containing methanol, water and oxygen is heated to be gasified. In FIG. 1, the internal structure of the gasifier 1 is schematically illustrated.

The main container 11 is in the form of a closed-end pipe and provided with a combustion gas discharge port 111 at the upper end. The supply pipe 12 has a double-pipe structure made up of an outer pipe 121 and an inner pipe 122. The outer pipe 121 has an upper end connected to piping 71 outside the main container 11 and a lower end which is open within the main container 11. The inner pipe 122 has an upper end connected to piping 73, 82 outside the main container 11 and a lower end which is open within the outer pipe 121. The piping 71 connected to the outer pipe 121 is connected to an air blower 72. The piping 73 connected to the inner pipe 122 is connected to the supply source (not shown) of the fuel for gasifying (e.g. LPG: liquefied petroleum gas) used in starting the operation. The piping 73 is provided with an automatically operated valve 73a. The catalytic combustion portion 13 is provided at a lower portion in the outer pipe 121. In this catalytic combustion portion 13, high-temperature combustion gas is generated by catalytic combustion of hydrogen or the above-described fuel for starting the operation. The catalytic combustion portion 13 is loaded with a catalyst for combustion. As the catalyst for combustion, platinum-metal catalysts such as platinum or palladium may be used, for example. The distribution pipe 14 includes a material inlet end 141, a material outlet end 142 and a spiral portion surrounding the supply pipe 12. The material inlet end 141 extends out of the main container 11 through the lower end of the main container 11. The material outlet end 142 extends out of the main container 11 through the upper end of the main container 11. A heat storage material (not shown) is loaded around the supply pipe 12 and the distribution pipe 14 in the main container 11, as required.

As shown in FIG. 1, the reformer 2 includes a main container 21 and a reforming reaction portion 22. In this reformer 2, methanol contained in the mixed material and gasified by the gasifier 1 is reformed by steam reforming reaction and partial oxidation reforming reaction, whereby reformed gas containing hydrogen is obtained.

The main container 21 is in the form of a closed-end pipe and provided with a material inlet 211 at the lower end and a reformed gas outlet 212 at the upper end. The material inlet 211 is connected to the material outlet end 142 of the gasifier 1. The reforming reaction portion 22 is provided within the main container 21 and loaded with a reforming catalyst (not shown). The reforming catalyst causes steam reforming reaction and partial oxidation reforming reaction of methanol contained in the gasified mixed material. As the reforming catalyst, use may be made of e.g. a mixture containing aluminum oxide, copper oxide and zinc oxide. For instance, the contents of CuO, ZnO and Al2O3 in the reforming catalyst may be 42 wt %, 47 wt % and 10 wt %, respectively.

The heat exchanger 3 includes a methanol aqueous solution inlet 31, a methanol aqueous solution outlet 32, a reformed gas inlet 33 and a reformed gas outlet 34. In the heat exchanger 3, by the heat exchange between methanol aqueous solution before being supplied to the gasifier 1 and the reformed gas generated by the reformer 2, methanol aqueous solution is preheated, while the reformed gas is cooled. Specifically, the heat exchanger 3 includes a path for methanol aqueous solution to flow from the methanol aqueous solution inlet 31 to the methanol aqueous solution outlet 32 and a path for the reformed gas to flow from the reformed gas inlet 33 toward the reformed gas outlet 34, and heat exchange is performed between these two paths. The heat exchanger 3 serves to reduce the thermal energy required for heating and gasifying the mixed material in the gasifier 1.

The methanol aqueous solution inlet 31 is connected to the supply source (not shown) of methanol aqueous solution via piping 74 and a pump 75. The pump 75 supplies methanol aqueous solution at a predetermined pressure. The methanol aqueous solution outlet 32 is connected to the material inlet end 141 of the gasifier 1 via piping 76. To the piping 76, an end of piping 77 is connected. Another end of the piping 77 is connected to the supply source (not shown) of an oxygen-containing gas (e.g. oxygen-rich gas or air). The piping 77 is provided with a flow control valve 77a for controlling the flow of the oxygen-containing gas. The reformed gas inlet 33 is connected to the reformed gas outlet 212 of the reformer 2 via piping 78. The reformed gas outlet 34 is connected to the gas-liquid separator 4, which will be described later, via piping 79.

The gas-liquid separator 4 includes a drain discharge port 41 and serves to separate the liquid component 42 contained in the reformed gas (e.g. water or unreacted methanol) from the reformed gas. The liquid component 42 collected in the gas-liquid separator 4 is discharged as drain from the gas-liquid separator 4 through the drain discharge port 41.

The PSA separation apparatus 5 includes at least one adsorption tower loaded with an adsorbent and is designed to extract hydrogen-rich gas from the reformed gas by the pressure swing adsorption gas separation method (PSA separation method) using the adsorption tower. For instance, as the adsorbent to be loaded in the adsorption tower, use may be made of a zeolite-based adsorbent, a carbon-based adsorbent or an alumina adsorbent, and preferably, a zeolite-based adsorbent is employed. The adsorption tower may be loaded with either a single kind of adsorbent or a plurality of kinds of adsorbents. In the gas separation performed by the PSA separation method in the PSA separation apparatus 5, a cycle including an adsorption step, a desorption step and a regeneration step is repetitively performed. In the adsorption step, reformed gas is supplied into the adsorption tower the interior of which is kept at a high pressure so that the unnecessary components (e.g. carbon monoxide, carbon dioxide or nitrogen) contained in the reformed gas are adsorbed by the adsorbent. Thus, hydrogen-rich gas is discharged from the adsorption tower. In the desorption step, the pressure in the adsorption tower is reduced for desorbing the unnecessary components from the adsorbent, and the offgas including hydrogen remaining in the adsorption tower and the unnecessary components is discharged to the outside. In the regeneration step, the adsorption ability of the adsorbent for the unnecessary components is recovered by e.g. supplying cleaning gas into the adsorption tower, whereby the adsorption tower becomes ready for the next adsorption step. As the PSA separation apparatus 5, use may be made of a conventionally-known PSA hydrogen separation apparatus, The drain treatment unit 6 includes a main container 61, a jacket 62, an evaporation tower 63 and a catalytic decomposition portion 64. The drain treatment unit 6 serves to evaporate the drain discharged from the gas-liquid separator 4 and decompose the gas generated by the evaporation (evaporating gas) by catalysis. In FIG. 1, the internal structure of the drain treatment unit 6 is schematically illustrated.

The main container 61 is in the form of a pipe which is open at the upper end and provided with a combustion gas inlet 611 at the lower end. The combustion gas inlet 611 is connected to the combustion gas discharge port 111 of the gasifier 1 via piping 91, so that the combustion gas discharged from the combustion gas discharge port 111 is supplied into the main container 61. The jacket 62 has an annular shape surrounding the periphery of the main container 61 and is provided with a drain inlet 621 at the lower end. The drain inlet 621 is connected to the drain discharge port 41 via piping 92, so that the drain discharged from the gas-liquid separator 4 is supplied into the jacket 62. The piping 92 is provided with a flow control valve 92a for controlling the flow of the drain. The evaporation tower 63 is in the form of a bottomed pipe and arranged at a lower portion in the main container 61. The evaporation tower 63 has a lower end connected to the jacket 62 via a communication pipe 631 and an upper end which is open within the main container 61. The catalytic decomposition portion 64 is arranged above the evaporation tower 63 in the main container 61 and serves to decompose hazardous components contained in the evaporating gas by catalysis. The catalytic decomposition portion 64 is loaded with a decomposition catalyst for catalyzing the decomposition of the hazardous components. For instance, to decompose methanol, platinum-metal oxidation catalyst such as platinum or palladium may be used as the decomposition catalyst.

The operation and advantages of the hydrogen production system X1 having the above-described structure will be described below. In operating the hydrogen production system X1, methanol aqueous solution of a predetermined concentration is supplied from the methanol aqueous solution inlet 31 to the heat exchanger 3 through the piping 74 by the operation of the pump 75. In the heat exchanger 3, the methanol aqueous solution, which has a relatively low temperature (e.g. 10 to 25° C.), is heated (preheated) to e.g. 137° C. by the heat exchange with the reformed gas supplied to the heat exchanger 3, which has a relatively high temperature (e.g. 230 to 270° C.). The methanol aqueous solution preheated in the heat exchanger 3 is discharged from the heat exchanger 3 through the methanol aqueous solution outlet 32 and flows through the piping 76. In flowing through the piping 76, the methanol aqueous solution is mixed with oxygen-containing gas (e.g. oxygen-rich gas or air) supplied into the piping 76 through the piping 77, The supply of the oxygen-containing gas can be controlled by the flow control valve 77a.

The mixed material (containing methanol, water and oxygen) prepared in this way is supplied into the distribution pipe 14 of the gasifier 1 from the material inlet end 141. The mixed material is gasified in the gasifier 1. Specifically, the mixed material supplied into the distribution pipe 14 is heated, in flowing through the distribution pipe 14, by the combustion gas generated in the catalytic combustion portion 13 to a predetermined reaction temperature (e.g. 230 to 270° C. required for the subsequent reforming reaction in the reformer 2, which will be described later, and gasified. The gasified mixed material is discharged from the gasifier 1 through the material outlet end 142 of the distribution pipe 14 and supplied to the reformer 2 through the material inlet 211.

The mixed material supplied to the reformer 2 is introduced into the reforming reaction portion 22 and subjected to reforming reaction. Specifically, by the action of the reforming catalyst, steam reforming reaction of methanol which is endothermic reaction and partial oxidation reforming reaction of methanol which is exothermic reaction occur. Thus, reformed gas containing hydrogen is generated from the gasified mixed material. In this embodiment, the proportion of methanol consumed by each reaction (i.e., the ratio between steam reforming reaction and partial oxidation reforming reaction) is so set that the reaction temperature in the reforming reaction portion 22 is maintained substantially constant (e.g. 230 to 270° C. In this way, autothermal reforming of methanol proceeds in the reforming reaction portion 22.

The reformed gas generated in the reforming reaction portion 22 is discharged from the reformer 2 through the reformed gas outlet 212 and supplied to the heat exchanger 3 through the piping 78 and the reformed gas inlet 33. As noted before, in the heat exchanger 3, the reformed gas, which has a relatively high temperature (e.g. 230 to 270° C.), is cooled to e.g. 40° C. by the heat exchange with the methanol aqueous solution supplied to the heat exchanger 3, which has a relatively low temperature (e.g. 10 to 25° C.). The reformed gas cooled in the heat exchanger 3 is discharged from the heat exchanger 3 through the reformed gas outlet 34 and supplied to the gas-liquid separator 4 via the piping 79.

In the gas-liquid separator 4, the reformed gas is subjected to gas-liquid separation. Specifically, liquid components 42 contained in the reformed gas supplied to the gas-liquid separator 4 are separated from the reformed gas. This process prevents the liquid components 42 from entering the adsorption tower of the PSA separation apparatus 5 located downstream from the gas-liquid separator 4. As a result, the adsorbent loaded in the adsorption tower is prevented from being deteriorated due to the contact with liquid components 42. The liquid components 42 collected by the gas-liquid separation is discharged as drain from the gas-liquid separator 4 through the drain discharge port 41 and supplied to the drain treatment unit 6 through the piping 92 and the flow control valve 92a. Specifically, the drain is supplied to the drain treatment unit by the pressure of the reformed gas. The reformed gas after passing through the gas-liquid separator 4 is supplied to the PSA separation apparatus 5 through the piping 80.

In the PSA separation apparatus 5, the reformed gas is subjected to pressure swing adsorption gas separation step. Specifically, in the PSA separation apparatus 5, the PSA separation method is performed in which a cycle including an adsorption step, a desorption step and a regeneration step is repetitively performed. In the adsorption step, the reformed gas containing hydrogen is supplied into the adsorption tower the interior of which is kept at a high pressure. In the adsorption tower, unnecessary components (e.g. carbon monoxide, carbon dioxide or nitrogen) contained in the reformed gas are adsorbed by the adsorbent for removal, and hydrogen-rich gas (gas with high hydrogen concentration) is discharged from the adsorption tower as product gas. The hydrogen-rich gas is taken out of the hydrogen production system X1 through the piping 81. In the desorption step, the unnecessary components are desorbed from the adsorbent by reducing the pressure in the adsorption tower, and offgas including hydrogen remaining in the adsorption tower and the unnecessary components is discharged from the adsorption tower. The offgas is supplied to the gasifier 1 through the piping 82 as the fuel for gasifying. In the regeneration step, the adsorption ability of the adsorbent for the unnecessary components is recovered by e.g. supplying cleaning gas into the adsorption tower. In this way, hydrogen-rich gas (product gas) and offgas are taken out of the PSA apparatus 5. The hydrogen-rich gas may be used continuously for a certain purpose or stored in a predetermined tank, for example.

The offgas supplied to the gasifier 1 as the fuel for gasifying is introduced into the catalytic combustion portion 13 through the inner pipe 122 and the outer pipe 121. By the operation of the blower 72, air is continuously supplied to the catalytic combustion portion 13 through the piping 71 and the outer pipe 121. Thus, by the action of the catalyst for combustion, hydrogen contained in the offgas is subjected to catalytic combustion in the catalytic combustion portion 13, whereby high-temperature combustion gas (e.g. 500 to 600° C.) is generated. The high-temperature combustion gas generated in the catalytic combustion portion 13 is discharged from the open end (lower end in the figure) of the outer pipe 121 of the supply pipe 12 and flows around the distribution pipe 14 within the main container 11. Then, the combustion gas exits the gasifier 1 through the combustion gas discharge port 111. When the combustion gas flows around the distribution pipe 14, thermal energy is transferred from the combustion gas as the heat source to the distribution pipe 14. As a result, the mixed material flowing through the distribution pipe 14 is heated to a predetermined temperature (e.g. 230 to 270° C.) and gasified. Due to the provision of the spiral portion, the distribution pipe 14 has a large surface area (heat receiving area). When the combustion gas is discharged from the gas discharge port 111 after releasing its thermal energy by heat transfer to the mixed material flowing through the distribution pipe 14, the combustion gas still has a relatively high temperature (e.g. about 300° C.).

The combustion gas discharged from the combustion gas discharge port 111 of the gasifier 1 and having a relatively high temperature is supplied to the main container 61 of the drain treatment unit 6 through the piping 91 and the combustion gas inlet 611. The combustion gas supplied to the main container 61 flows around the evaporation tower 63 (i.e., near the bottom surface and side surface) located above the combustion gas inlet 611 to reach an upper portion of the main container 61. Meanwhile, in the drain treatment unit 6, the drain discharged from the gas-liquid separator 4 is supplied to the jacket 62 through the drain inlet 621. The drain is subjected to an evaporation step and a decomposition step in the drain treatment unit 6. Specifically, the drain supplied to the jacket 62 is introduced into the evaporation tower 63 through the communication pipe 631. When the combustion gas flows through the main container 61, thermal energy is transferred from the combustion gas as the heat source to the evaporation tower 63. Thus, the drain introduced into the evaporation tower 63 is heated for evaporation. Specifically, water and methanol contained in the drain are evaporated to become evaporating gas (water vapor and methanol vapor). The evaporating gas exits the evaporation tower 63 from the upper end, is mixed with the combustion gas in the main container 61 and then passes through the catalytic decomposition portion 64. In the catalytic decomposition portion 64, methanol vapor in the evaporating gas is decomposed by the action of the oxidation catalyst to eventually produce harmless carbon dioxide and water. After passing through the catalytic decomposition portion 64, the gas is discharged from the drain treatment unit 6 into the atmosphere.

As described above, during the normal operation of the hydrogen production system X1, the material successively passes through the heat exchanger 3, the gasifier 1, the reformer 2, the heat exchanger 3, the gas-liquid separator 4 and the PSA separation apparatus 5. By this process, hydrogen-rich gas is taken out of the PSA separation apparatus 5 and offgas discharged from the PSA separation apparatus 5 is supplied to the gasifier 1. In the gasifier 1, combustion gas is generated by catalytic combustion of the offgas, and the combustion gas is supplied to the drain treatment unit 6 after the heat exchange with the mixed material. In the drain treatment unit 6, the drain discharged from the gas-liquid separator 4 is heated for evaporation by the combustion gas. The evaporating gas is discharged into atmosphere after methanol, which is a harmful component contained in the evaporating gas, is decomposed.

The above-described operation of the hydrogen production system X1 is the normal operation performed when offgas is sufficiently supplied from the PSA separation apparatus 5 to the catalytic combustion portion 13 of the gasifier 1. However, in starting the system, for example, offgas is not sufficiently supplied from the PSA separation apparatus 5 to the catalytic combustion portion 13. In this case, for instance, the automatically operated valve 73a may be kept open until a sufficient amount of offgas is supplied from the PSA separation apparatus 5 to the catalytic combustion portion 13. By this, fuel for gasifying (e.g. LPG) necessary for the catalytic combustion portion 13 is additionally supplied to the gasifier 1 and the catalytic combustion portion 13.

In the above-described hydrogen production system X1, by adjusting the supply of offgas (supply per unit time) from the PSA separation apparatus 5 to the gasifier 1 during the normal operation, the fuel required for heating the mixed material into the gaseous state of a desired temperature is provided by the offgas from the PSA separation apparatus 5 alone. Moreover, in the hydrogen production system X1, the inside of the reformer is maintained at a desired reaction temperature by adjusting the ratio between the steam reforming reaction and the partial oxidation reforming reaction of the hydrocarbon-based material which proceed in the reforming reaction portion 22 of the reformer 2. In this way, in the normal operation of the hydrogen production system X1, the mixed material is continuously heated and gasified by the self-generating heat obtained by the operation of the system, and the inside of the reforming reaction portion 22 of the reformer 2 is kept at a desired temperature.

In the hydrogen production system X1, drain generated by the operation of the system X1 is treated by heating and evaporating the drain by the combustion gas after used for heating the mixed material in the gasifier 1. That is, the heat source for evaporating the drain is provided sufficiently only by the combustion gas after heating the mixed material. In this way, the drain treatment in the hydrogen production system X1 is performed automatically only by the use of the self-generating heat obtained by the operation of the system X1. Thus, as compared with a case where a facility exclusively used for drain treatment is additionally provided or the drain is disposed of as waste, the cost for drain treatment is reduced, and the treatment efficiency is enhanced.

Further, in the drain treatment in the hydrogen production system X1, methanol vapor, which is a harmful component contained in the evaporating gas generated by heating the drain, passes through the catalytic decomposition portion 64 to be decomposed and become harmless. According to this method in which drain is evaporated and the evaporating gas is caused to pass through the catalytic decomposition portion 64, treatment of the drain containing harmful components is performed properly and automatically as the system operates. This drain treatment method is suitable for reducing the cost for the treatment.

As described above, during the normal operation of the hydrogen production system X1, by using the self-generating heat obtained by the system operation alone, the mixed material is heated and gasified in the gasifier 1, a proper reaction temperature for the reforming reaction is maintained in the reformer 2, and drain is continuously evaporated in the drain treatment unit 6. With this hydrogen production using the thermally-independent hydrogen production system X1, both of the hydrogen production and the drain treatment can be performed without receiving the supply of heat source such as external fuel. Thus, the damage to the environment due to the system operation is relatively small.

Though the present invention has been described as above, the scope of the present invention is not limited to the foregoing embodiment. The specific structure of the hydrogen production system according to the present invention can be varied in many ways without departing from the spirit of the present invention. For instance, the hydrogen production system X1 may be so varied that drain discharged from a facility other than the hydrogen production system X1 is additionally supplied to the drain treatment unit 6 for treatment. That is, when the combustion gas used for heating drain in the drain treatment unit 6 has excess thermal energy even after the evaporation of the drain generated in the hydrogen production system X1, drain supplied from another facility can be additionally evaporated in the drain treatment unit 6. Such variation of the system is suitable for effectively utilizing the excess thermal energy of the combustion gas.

The invention claimed is:

1. A hydrogen production system comprising:
a gasifier for gasifying a mixed material containing a hydrocarbon-based material by heating;
a reformer for producing reformed gas containing hydrogen from the gasified mixed material by reforming reaction of the hydrocarbon-based material;
a gas-liquid separator for separating and removing a liquid component contained in the reformed gas from the reformed gas for discharge as drain; and
a pressure swing adsorption gas separation apparatus for performing pressure swing adsorption gas separation using an adsorption tower loaded with an adsorbent, in which the reformed gas after passing through the gas-liquid separator is supplied into the adsorption tower for adsorbing an unnecessary component contained in the reformed gas by the adsorbent, hydrogen-rich gas is discharged from the adsorption tower, the unnecessary component is desorbed from the adsorbent, and offgas containing hydrogen remaining in the adsorption tower and the unnecessary component is discharged;
the gasifier being designed to burn the offgas discharged from the adsorption tower to produce combustion gas and heat the mixed material by using the combustion gas as heat source, the gasifier including a first container having a combustion gas outlet for discharging the combustion gas;
wherein the system further comprises a second container accommodating an evaporator for evaporating the drain discharged from the gas-liquid separator by the combustion gas discharged from the gasifier, the second container also accommodating a decomposer downstream from the evaporator for catalytically decomposing a hazardous component contained in the evaporated gas from the evaporator, the second container having a combustion gas inlet connected to the combustion gas outlet of the first container for introducing the combustion gas from the gasifier into the second container and a drain inlet connected to the gas-liquid separator for receiving the drain from the gas-liquid separator, the second container including a common gas outlet for discharging the combustion gas to an outside environment together with gases resulting from the evaporation of the drain and the decomposition of the hazardous component.

2. The hydrogen production system according to claim 1, wherein the second container is provided with a jacket at a periphery thereof into which the drain is supplied from the gas-liquid separator, the jacket communicating with the evaporator in the second container.

3. The hydrogen production system according to claim 1, wherein the evaporator comprises an evaporation tower in a form of a bottomed pipe.

4. The hydrogen production system according to claim 1, wherein the decomposer includes an oxidation catalyst.

5. The hydrogen production system according to claim 1, further comprising a heat exchanger for preheating the mixed material before supply to the gasifier by heat exchange with the reformed gas that is discharged from the reformer for supply to the gas-liquid separator.

6. The hydrogen production system according to claim 1, wherein the common gas outlet is an only outlet that discharges the combustion gas to the outside environment from the hydrogen production system.

7. The hydrogen production system according to claim 1, further comprising a combustion gas passage that transfers combustion gas from the combustion gas outlet of the first container to the combustion gas inlet of the second container, such that the combustion gas is used as a heat source in both the first and second containers.

* * * * *